(12) United States Patent
Gupta et al.

(10) Patent No.: US 8,566,636 B2
(45) Date of Patent: *Oct. 22, 2013

(54) APPLICATION RECOVERY IN A FILE SYSTEM

(75) Inventors: Karan Gupta, San Jose, CA (US);
Reshu Jain, San Jose, CA (US);
Himabindu Pucha, San Jose, CA (US);
Prasenjit Sarkar, San Jose, CA (US);
Dinesh K. Subhraveti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 316 days.

This patent is subject to a terminal disclaimer.

(21) Appl. No.: 13/015,127

(22) Filed: Jan. 27, 2011

(65) Prior Publication Data
US 2012/0198269 A1    Aug. 2, 2012

(51) Int. Cl.
*G06F 11/00* (2006.01)
(52) U.S. Cl.
USPC ........................................ 714/6.3; 714/4.11
(58) Field of Classification Search
USPC .................................. 714/4.11, 6.3
See application file for complete search history.

(56) References Cited

U.S. PATENT DOCUMENTS

| | | | | |
|---|---|---|---|---|
| 6,697,960 | B1* | 2/2004 | Clark et al. | 714/15 |
| 7,653,668 | B1* | 1/2010 | Shelat et al. | 707/610 |
| 8,326,990 | B1* | 12/2012 | Li et al. | 709/226 |
| 2005/0283658 | A1* | 12/2005 | Clark et al. | 714/11 |
| 2007/0220223 | A1* | 9/2007 | Boyd et al. | 711/162 |
| 2009/0077414 | A1* | 3/2009 | Benhase et al. | 714/4 |
| 2012/0054429 | A1* | 3/2012 | Gupta et al. | 711/114 |

FOREIGN PATENT DOCUMENTS

| | | |
|---|---|---|
| CN | 1614566 | 5/2005 |
| CN | 101055538 | 10/2007 |
| CN | 101127000 | 2/2008 |

* cited by examiner

*Primary Examiner* — Yolanda L Wilson
(74) *Attorney, Agent, or Firm* — Lieberman & Brandsdorfer, LLC

(57) ABSTRACT

Embodiments of the invention relate to block layout and block allocation in a file system to support transparency of application processing. At least one copy of an application is replicated in a write affinity region of a secondary server, and at least one copy of the application is replicated in a wide striping region across a cluster file system. When the application is subject to failure, application processing is transferred from the failure location to the write affinity copy. At the same time, the failed application is rebuilt using the wide striping replication of the application. Once the application is rebuilt, processing may return to the failed location employing the rebuilt application.

16 Claims, 5 Drawing Sheets

US 8,566,636 B2

APPLICATION RECOVERY IN A FILE SYSTEM

BACKGROUND

This invention relates to recovery of application processing in a computer system. More specifically, the invention relates to application failover and rebuild of a failed application in a transparent manner.

A data storage block or a storage block, herein after referred to as a block, refers to specific areas of address space on a storage device. For example, one data block may be a collection of sectors or bytes in an area of disk space. Blocks are manipulated as units. Large block allocations allow a large amount of data to be retrieved in a single I/O transaction. In one embodiment, a block is a fixed-size unit of data that is transferred together. A file system is a collection of file data maintained by an implementation that store, organize, and maintain file data in a file and/or directory hierarchy. File systems employ techniques to write data to storage media using block allocation techniques. Typically, a storage system provides access to information that is stored on one or more storage devices connected to the storage system. Access to the information is possible by organizing the storage devices into volumes, which logically organize the information stored on the storage devices.

The storage system may be further configured to operate according to a client/server model of information delivery to thereby allow many clients to access data containers stored on the system. In this model, the client may employ an application, such as a database application, executing on a computer that connects to the storage system over a computer network. Each client may request the services of the storage system by issuing file-based protocol messages to the system over the network. A plurality of storage systems may be interconnected to provide a storage system environment configured to service many clients. Each storage system may be configured to service one or more volumes, wherein each volume stores one or more data containers.

BRIEF SUMMARY

This invention comprises a system and article for recovery and application performance transparency in a cluster file system.

In one aspect, a computer system is provided with a shared nothing cluster file system having a distributed set of server nodes, including both a first server node and a second server node. A first copy of a first application is provided local to the first server node and stored in a first write affinity region local to the first server node, a second copy of the first application is stored in a second write affinity region local to the second server node, and a third copy of the first application is stored access wide striping regions in the cluster. A service manager is provided in the cluster to support local services of a first application from the first server, and a copy manager is provided in the cluster to specify a quantity of replication copies of the first application for wide striping. Following failure of the first application by the service manager, a recovery manager is provided to move application processing of the first application to the second server node in the cluster with the second copy and to communicate with the copy manager to recover the failed first application using the third copy.

In another aspect, a computer program product is provided with a computer readable storage medium having embodied computer readable program code. More specifically, computer readable program code is provided to define two or more region types in a file system to support a block allocation. One of the region types is a write affinity region And the other region type is a wide striping region. Computer readable program code is provided to locally serve a first application from a first write affinity copy. Following failure of the first application, computer readable program code is provided to move application processing of the first application to a different server node in the cluster using a replicated write affinity copy of the first application. In addition to the write affinity copy, computer readable program code is provided to select copies of data of the first application for storage of a third copy of the first application in wide stripe regions across the cluster. Computer readable program code is provided to recover the first application with the copy of the first application in the wide stripe regions.

In a further aspect, a cluster file system is provided with a distributed set of server nodes. A first application is locally serviced from a first server node. Following a failure of the first application, processing is moved to another server node in the cluster hosting a replicated copy of the first application in a write affinity region. In addition, the failed first application is recovered by using distributed segments from wide striping regions across the cluster.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
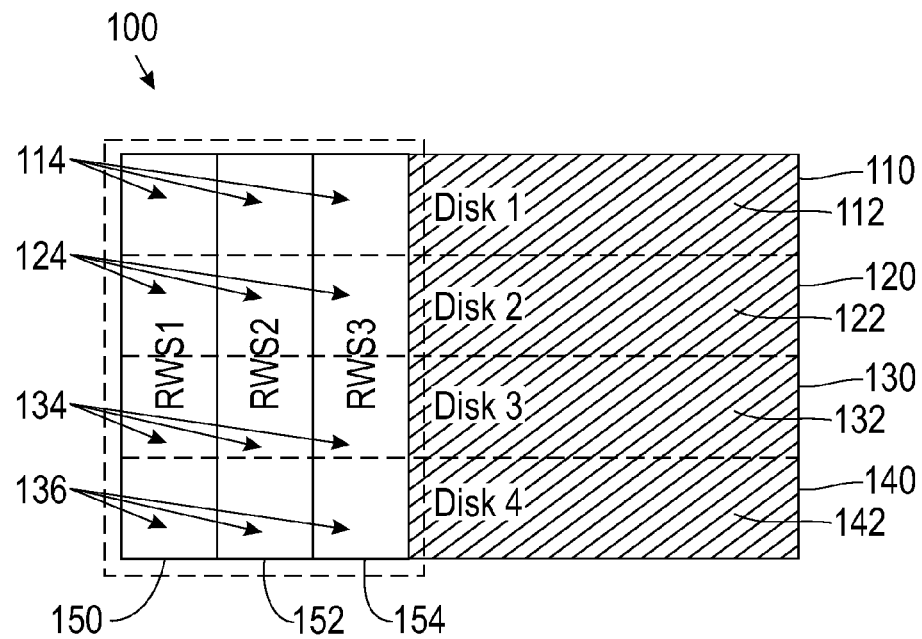
FIG. 1 is a block diagram of a logical view of a block allocation map for wide striping.

It will be readily understood that the components of the present invention, as generally described and illustrated in the Figures herein, may be arranged and designed in a wide variety of different configurations. Thus, the following detailed description of the embodiments of the apparatus, system, and article of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a write stream manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A cluster file system is an enterprise storage file system which can be concurrently accessed for reading and writing by multiple computers. More specifically, in such file systems the computers are in the form of cluster servers which connect to an underlying storage device. There are different architectural approaches to a shared disk file system, including distribution of file information across all the servers in the cluster to provide a consistent file system image across the cluster servers. Each storage device in the storage file system has a plurality of blocks; each block is a fixed size unit of data on a storage device. Data is written to storage in groupings of blocks, and is similarly read from storage in groupings of blocks. In one embodiment, file systems address data in blocks which contain a certain number of disk sectors; the smallest amount of disk space that can be allocated for reading and writing.

Two types of block regions are defined in the file system, a write affinity region and a wide striping region. The write affinity region has blocks from data storage local to a server in the cluster. The wide striping region has blocks from all data storage across the cluster. In other words, the write affinity region is limited to blocks that are local to a server node, and the wide striping region includes blocks that are distributed across the storage devices of the cluster, including at least one storage device local to the server node. Writing data to a write affinity region is desirable when it is necessary to reduce network traffic and as such improve the write performance. At the same time, wide striping allows all server nodes and disk resources in the cluster to be used uniformly.

Figure 2:
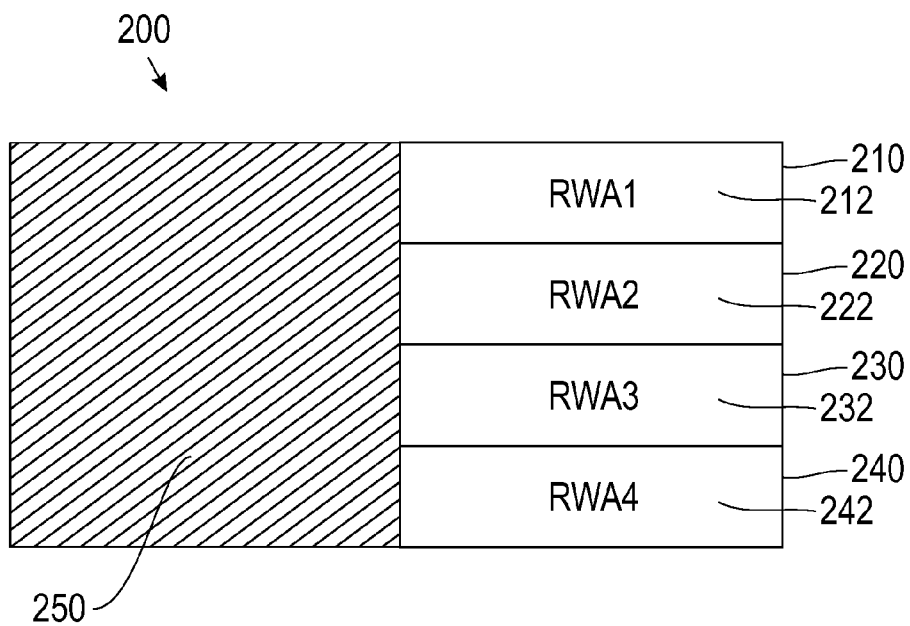
FIG. 2 is a block diagram of a logical view of a block allocation map for write affinity.

FIG. 1 is a block diagram (100) of a block allocation map for wide striping. As shown herein, there are four forms of data storage (110), (120), (130), and (140). Each data storage owns blocks, with the hashed lines (112), (122), (132), and (142) showing blocks that are not available as they are allocated for write affinity transactions, and the empty blocks (114), (124), (134), and (144) in wide striping regions (150), (152), and (154) that are available for a wide striping transaction. FIG. 2 is a block diagram (200) of a block allocation map for write affinity. As shown herein, there are four forms of data storage (210), (220), (230), and (240). Each data storage owns blocks, with hashed lines (250) showing blocks that are not available as they are allocated for wide striping transactions, and the empty blocks (212), (222), (232), and (242) show regions that are available for a write affinity transaction. Although the allocation maps (100) and (200) show four forms of data storage, the invention should not be limited to the quantity of storage elements shown herein. In one embodiment, there may be additional or a reduced quantity of storage elements provided.

Figure 3:
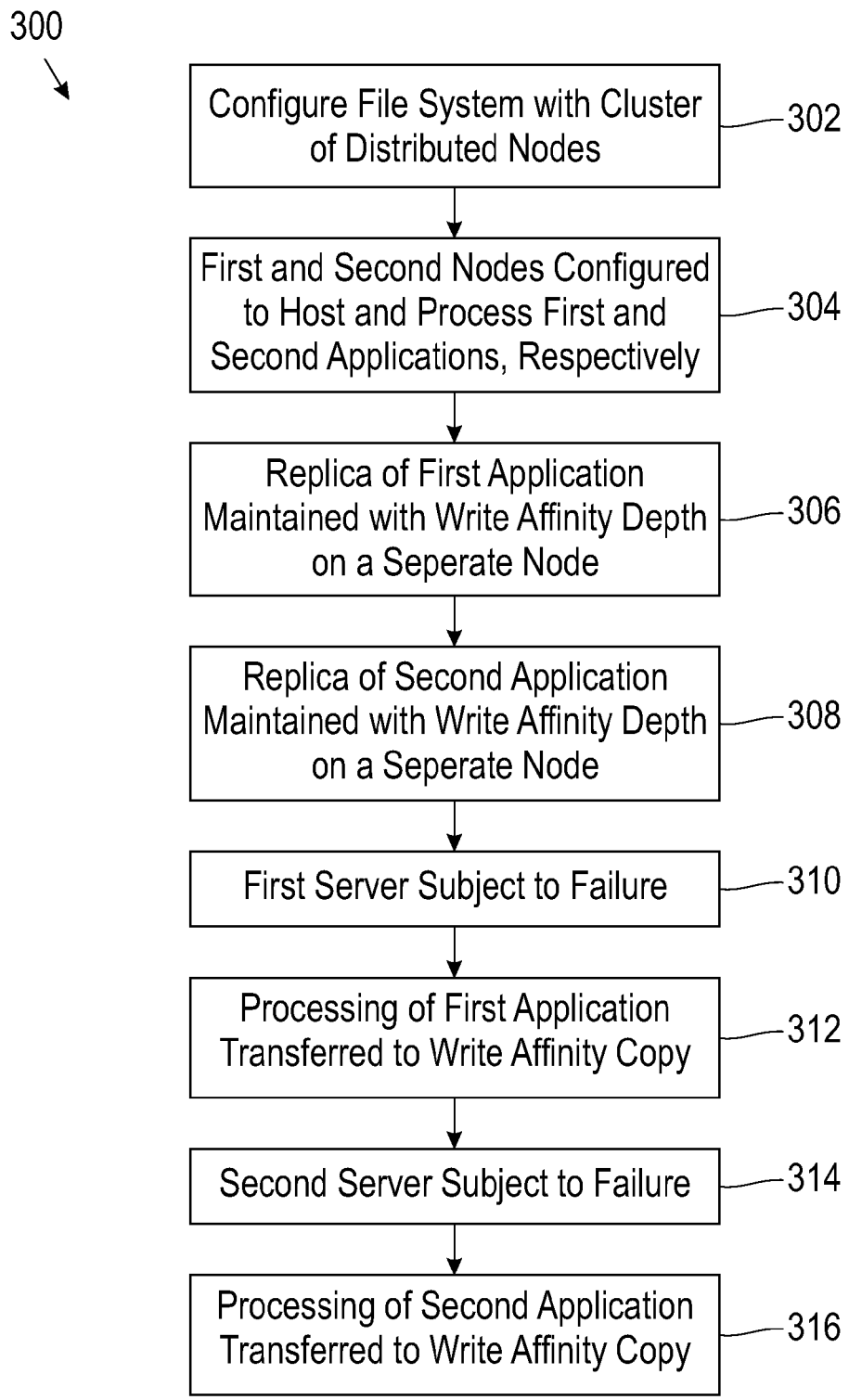
FIG. 3 is a flow chart illustrating the general process for supporting transparency in a failure scenario.

In a system for commodity hardware architecture, failure of a server node is considered normal operating practice. More specifically, it is know in the art that commodity hardware components are subject to failure. In one embodiment, failure of a machine and/or application includes, but is not limited to omission of performance of an action or task, the machine and/or application being offline, non-operational, etc. To mitigate the negative affect of server failure to both read and write transactions in a file system with commodity components and to ensure transparency, application replication is employed. FIG. 3 is a flow chart (300) illustrating the general process for supporting transparency in a file system. A file system is configured with a cluster of distributed server nodes (302). Each server node in the cluster is configured to support processing of data by an application. More specifically, a first server node may be configured to host and process a first application from a copy of the first application stored in a write affinity region, while a second server node in the cluster may be configured to host and process a second application from a copy of the second application stored in a write affinity region (304), etc. The copy of the applications stored in a write affinity region includes all of the blocks that support the application. Accordingly, the first application is locally supported from a copy in a write affinity region local to the first server node, and the second application is locally supported from a copy in a write affinity region local to the second server node.

To address failure of a commodity product in the cluster, at least one replica of each application is maintained with write affinity depth. More specifically, a replica of the first application is maintained with a write affinity depth on at least one of the secondary nodes in the cluster (306), and replica of the second application is maintained with a write affinity depth on at least one of the secondary nodes in the cluster (308). In one embodiment, the replica of the first application and the replica of the second application are maintained on different secondary nodes in the cluster. Similarly, in one embodiment, multiple server nodes in the cluster may be arranged on a computer rack where components of the cluster are vertically stacked on top of one another. In the rack environment, to maintain locality it may be desirable to maintain the replica with a write affinity depth of one of the applications on a secondary node in the cluster that is on the same rack as a primary copy of the application. Accordingly, at least one replica of each of the first and second applications is maintained with a write affinity depth on separate secondary nodes in the cluster.

At such time as the server node hosting one of the first or second applications is subject to a failure, application processing is moved to a secondary node with a write affinity replica of the application. More specifically, in order to provide transparency with respect to support and processing, the write affinity replica is activated. As shown herein, at such time as the first server node may be subject to a failure (310), processing of the first application is transferred to the write affinity copy local to one of the secondary nodes in the cluster (312). Similarly, at such time as the second server node may be subject to a failure (314), processing of the second application is transferred to the write affinity copy local to one of the secondary nodes in the cluster (316). Accordingly, transfer of application processing from a failed node to one of the secondary nodes with the write affinity copy maintains local performance of the application.

In addition to the write affinity application replicas, there are also wide striping replicas of each application in the cluster. Each application is divided into multiple blocks segments, with one or more block segments stored in a wide striping region of data storage remote from the server node hosting and processing transactions for a primary copy of the application. A number of block segments for application data of a first application are specified, with the block segments pertaining to the quantity of wide striping regions. A copy of each application block segment is stored on different data storage of server nodes in the cluster in order to distribute the application across the cluster and without impacting any one server node in the cluster. For example, if the quantity of block segments for the first application is set to three, then one set of segments of the first application is maintained on storage local to a first secondary node, a second set of block segments of the first application is maintained on storage local to a second secondary node, and a third set of block segments of the first application is maintained on storage local to a third secondary node. Accordingly, wide striping is employed as a tool to distribute copies of block segments of the application across the cluster.

Figure 4:
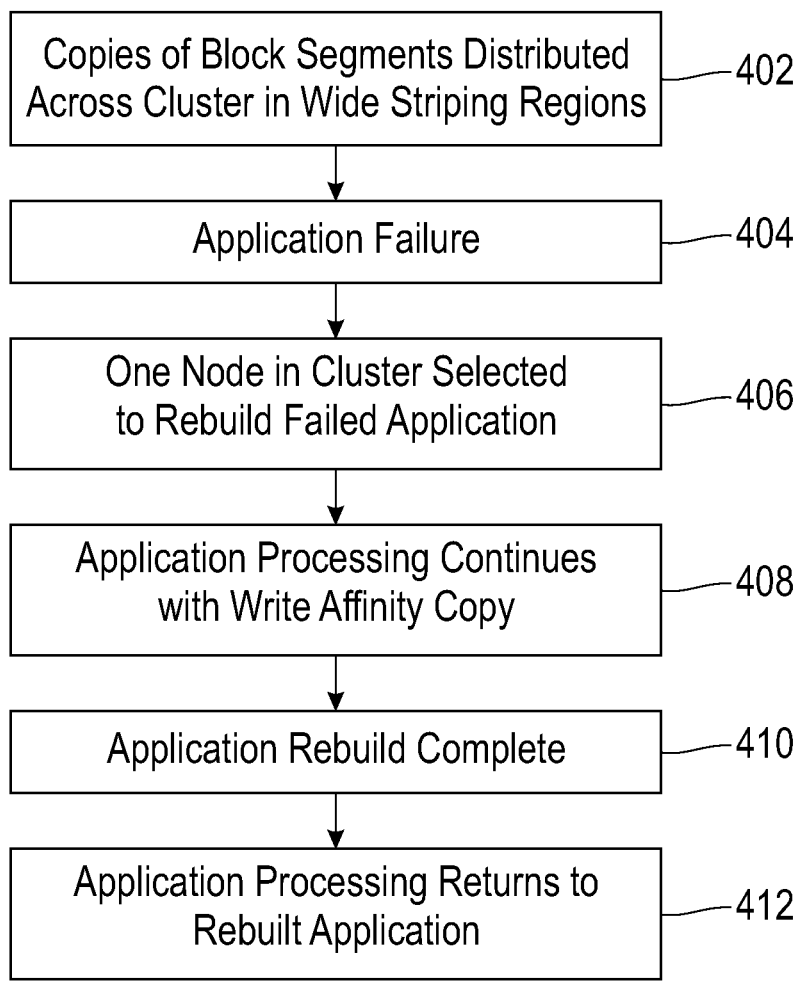
FIG. 4 is a flow chart illustrating the process for rebuilding an application from the wide striping replicas across the server nodes in the cluster.

Following failure of one of the server nodes, application processing is transferred to a write affinity copy to maintain transparency, and at the same time the failed application may be rebuilt from the blocks segments stored in the wide striping regions distributed across the cluster. FIG. 4 is a flow chart (400) illustrating rebuild of an application from the block segments stored in wide striping regions across data storage local to the server nodes in the cluster. Prior to instituting a rebuild, copies of block segments of the first application are distributed across the cluster in wide striping regions identifying specified blocks of the application to be retained on the different server nodes (402). In one embodiment, a combination of all of the block segments of the application in the wide striping regions of data storage comprises the application. Following failure of the application (404), one of the cluster nodes is selected for a rebuild of the failed application (406).

In one embodiment, the node selected for rebuild is the node that was subject to failure. At the same time as the rebuild takes place, a copy of the failed application in a write affinity region of a non-failed server node, i.e. a spare node, continues processing transactions on behalf of the failed application (408). The rebuild of the failed application employs the distributed block segments of the application in the wide stripe regions within the cluster so that each node in the cluster is affected minimally with application performance. Accordingly, the distribution and rebuild of the application provides load balancing as the burden of the rebuild is distributed across the cluster.

Processing of the first application is transferred to the write affinity copy, i.e. spare copy, until such time as the rebuild is completed. Once the rebuild of the failed application from the segments stored in the wide striping regions in the cluster is completed (410), application processing returns to the rebuilt application (412). At the same time, each of the server nodes with one of the wide striping distributed copies of the first application continue to support servicing transactions of other applications hosted by the server nodes. Accordingly, for each application supported in the cluster, a write affinity region assigned available blocks from data storage local to a server node in the cluster stores a replica of an application, and the wide striping regions in the cluster are assigned block segments of the application.

Figure 5:
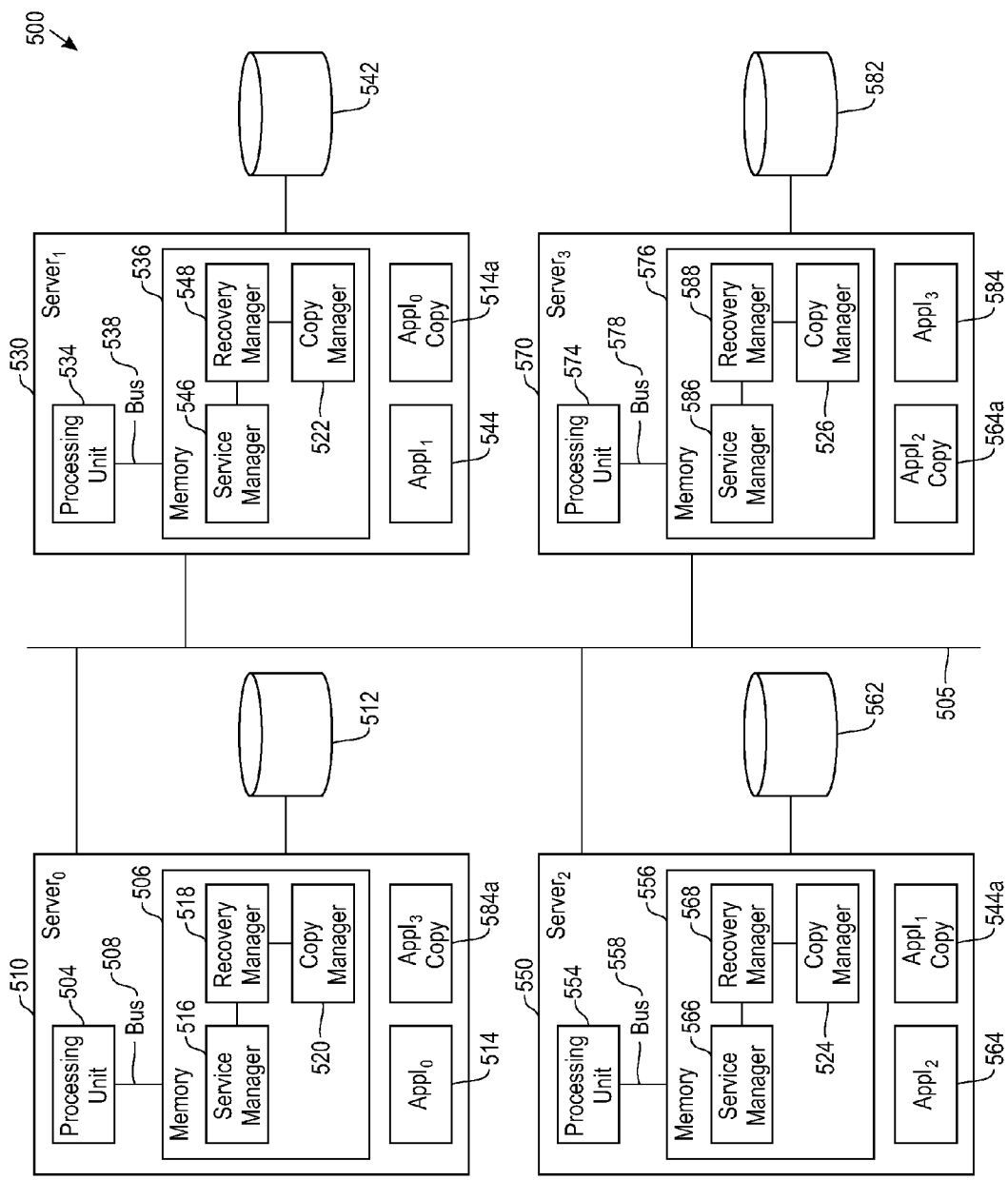
FIG. 5 is a block diagram illustrating tools embedded in a computer system to support continued processing of transactions in a shared nothing cluster file system, and is suggested for printing on the first page of the issued patent.

As demonstrated in the flow charts of FIGS. 1-4, a method is employed to support a transparency of application processing through the use of write affinity and wide striping regions of a file system. FIG. 5 is a block diagram (500) illustrating tools embedded in a computer system to support continued processing of transactions in a shared nothing cluster file system. A shared nothing architecture includes a cluster built of commodity hardware components. The coordination of all nodes in the cluster for the execution of users' applications on data is carried out by an execution framework which includes the filesystem that runs on top of the cluster. The central idea in this design is the idea of function shipping where a compute task is moved to the node that has data as opposed to the traditional data shipping approach where the data is moved from a storage node to a compute node. An important challenge in realizing performance in data intensive supercomputing systems is the achievement of high throughput for applications in a commodity environment where bandwidth resources are scarce and failures are common. To achieve this goal a clustered file system is developed which can optimize the performance of data-intensive supercomputing applications. As shown in FIG. 5, a cluster file system is mounted on multiple servers (510), (530), (550), and (570). A cluster file system is a file system that is simultaneously mounted on multiple servers. Although four servers are shown in the example herein, the invention should not be limited to this quantity of servers in the clustered file system. Similarly, although only one cluster is shown herein, in one embodiment, there may be multiple clusters provided with cross-cluster communication supported over a network connection.

Each of the servers in the system is provided with local storage and at the same time may communicate with remote storage within the cluster. More specifically, server (510) is provided with a processing unit (504), in communication with memory (506) across a bus (508) and in communication with data storage (512); server (530) is provided with a processing unit (534), in communication with memory (536) across a bus (538), in communication with data storage (542); server (550) is provided with a processing unit (554), in communication with memory (556) across a bus (558), in communication with data storage (562); and server (570) is provided with a processing unit (574), in communication with memory (576) across a bus (578), in communication with data storage (582). At the same time, server (510) may communicate with remote data storage (542), (562), and (582) across a network connection (505), server (530) may communicate with remote data storage (512), (562), and (582) across network connection (505), server (550) may communicate with remote data storage (512), (542), and (582) across network connection (505), and server (570) may communicate with remote data storage (512), (542), and (562) across network connection (505).

In one embodiment, each server in the cluster supports at least one application, with the application processing read and/or write transactions from one or more client machines in communication with the cluster. Based upon this embodiment, server (510) is shown with a first application (514), server (530) is shown with a second application (544), server (550) is shown with a third application (564), and server (570) is shown with a fourth application (584). Tools are provided to support application processing in the cluster and to maintain transparency of processing in the event of server failure. More specifically, at least one write affinity copy of each of the first, second, third and fourth applications are maintained in the cluster. As shown herein, in one embodiment one write affinity copy of the first application (514a) is local to server (530), one write affinity copy of the second application (544a) is local to server (550), one write affinity copy of the third application (564a) is local to server (570), and one write affinity copy of the fourth application (584a) is local to server (510). Accordingly, the distribution of write affinity copies of applications in the cluster ensures that a complete replica of each application is provided within the cluster.

A service manager is provided local to each server node in the cluster, with each service manager configured to support local processing of a local write affinity copy of an application. As shown herein, server node (510) is provided with service manager (516), server node (530) is provided with service manager (546), server node (550) is provided with service manager (566), and server node (570) is provided with service manager (586). Absent any failed applications, service manager (516) services the first application (514), service manager (546) services the second application (544), service manager (566) services the third application (564), and service manager (586) services the fourth application (584). As noted above, one or more of the servers in the cluster may be subject to failure. In the event of failure, a recovery manager is provided in the cluster to manage recovery and transparency of application processing. More specifically, the recovery manager is responsible for moving application processing of a failed application to a server node with a replicated copy of the failed application in its data storage write affinity region.

As shown herein, a recovery manager is provided local to each server node. More specifically, server node (510) is provided with recovery manager (518), server node (530) is provided with recovery manager (548), server node (550) is provided with recovery manager (568), and server node (570) is provided with recovery manager (588). Each recovery manager is in communication with the local service manager to support both recovery and application processing transparency. As shown, service manager (516) is in communication with recovery manager (518), service manager (546) is in communication with recovery manager (548), service manager (566) is in communication with recovery manager (568), and service manager (586) is in communication with recovery manager (588). In one embodiment, the recovery manager may be a cluster wide manager thereby removing the locality of the recovery manager from the individual nodes, while continuing to support recovery and application processing.

In addition to the write affinity copy of an application in the cluster, each application has a distributed copy of application block segments stored in wide striping regions. More specifically, the wide striping copy of the application is distributed across data storage local to two or more server nodes in the cluster. A copy manager is provided in the cluster to manage and specify the number of application segments stored in wide striping regions of data storage across the cluster. For wide striping, segments of applications in the form of data blocks that comprise an application are separately stored on data storage of different server nodes such that a complete copy of the application includes all of the application segments. In one embodiment, a copy manager is supported in a cluster-wide manner. Similarly, in one embodiment a separate copy manager is provided local to each server node. FIG. 5 shows local deployment of separate copy managers local to each server node, including copy manager (520) local to server node (510), copy manager (522) local to server node (530), copy manager (524) local to server node (550), and copy manager (526) local to server node (570). Accordingly, regardless of the local or global configuration of the copy manager, the functionality supports distribution of the application segments across wide striping regions of the cluster.

In the event of failure of one or more of the applications in the cluster, the copy manager(s) together with the recovery manager(s) facilitates rebuilding of a failed application. More specifically, the recovery manager is provided in the cluster to transfer the functionality of a failed application to the write affinity copy within the cluster and to rebuild a failed application from the wide striping copy of the failed application, wherein the rebuild includes application segments distributed across wide striping regions in the cluster. As such, communication between the recovery manager(s) and the copy manager(s) brings together the distributed copies of the failed application. In one embodiment, the recovery manager may be supported in a cluster-wide manner. Similarly, in one embodiment, a separate recovery manager is provided local to each server node in the cluster. Accordingly, regardless of the local or global configuration of the recovery manager, the functionality supports bringing together the distributed block segments of the failed application to facilitate a rebuild.

The transparent layout of the applications in the cluster is demonstrated in FIG. 5, with at least one write affinity copy of each application, together with a wide striping distribution of the application in wide striping regions within the cluster. The write affinity copy of the application includes a complete set of files and data on a single server node that comprise the application. Although the write affinity copy requires space availability on a secondary node in the cluster, it provides transparency without a significant increase in the associated burden. As described above, subsequent to a server node failure, the recovery manager facilitates and organizes a rebuild of the failed application with processing needs of the failed application transferred to the write affinity copy of the failed application. Once the failed application has been rebuilt with a complete set of files of the failed application from the wide striping regions, the service manager returns application processing to the recovered application.

The components shown and demonstrated herein for a single cluster configuration may be extrapolated across each cluster in the network. In a multi-cluster configuration, a tool is employed to select one of the clusters to support the copy of an application in the write affinity region and/or the wide striping region. For example, if one of the clusters in the network has characteristics that exhibit likelihood to fail, the tool may select a different cluster to replicate the application data, including write affinity and/or wide striping regions. By replication of an application in both wide striping and write affinity regions, the transparency of application support is preserved while mitigating burden on servers hosting application copies. At the same time, by employing inter-cluster relationships for application replication in a more stable cluster ensures likelihood of access and availability of the application.

As identified above, the service managers (516), (546), (566), and (586), recovery managers (518), (548), (568), and (588), and copy managers (520), (522), (524), and (526), function to manage availability, transparency, and rebuild of an application by maintaining at least one application copy in a write affinity region and a second application copy distributed in wide striping regions of the cluster. The managers are shown residing in memory local to the respective server. More specifically, service manager (516), recovery manager (518), and copy manager (520) each reside in memory (506) of server (510). Service manager (546), recovery manager (548), and copy manager (522) each reside in memory (536) of server (530); service manager (566), recovery manager (568), and copy manager (524) each reside in memory (556) of server (550); and service manager (586), recovery manager (588), and copy manager (526) each reside in memory (576) of server (570). Although in one embodiment, the service, recovery, and copy managers may reside as hardware tools external to memory of their respective server, or they may be implemented as a combination of hardware and software. Similarly, in one embodiment, the managers may be combined into a single functional item that incorporates the functionality of the separate items. As shown herein, each of the manager(s) are shown local to the respective servers. However, in one embodiment they may be collectively or individually distributed across the network and function as a unit to manage application support and read and write transaction transparency. Accordingly, the managers may be implemented as software tools, hardware tools, or a combination of software and hardware tools, to collect and organize data content.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
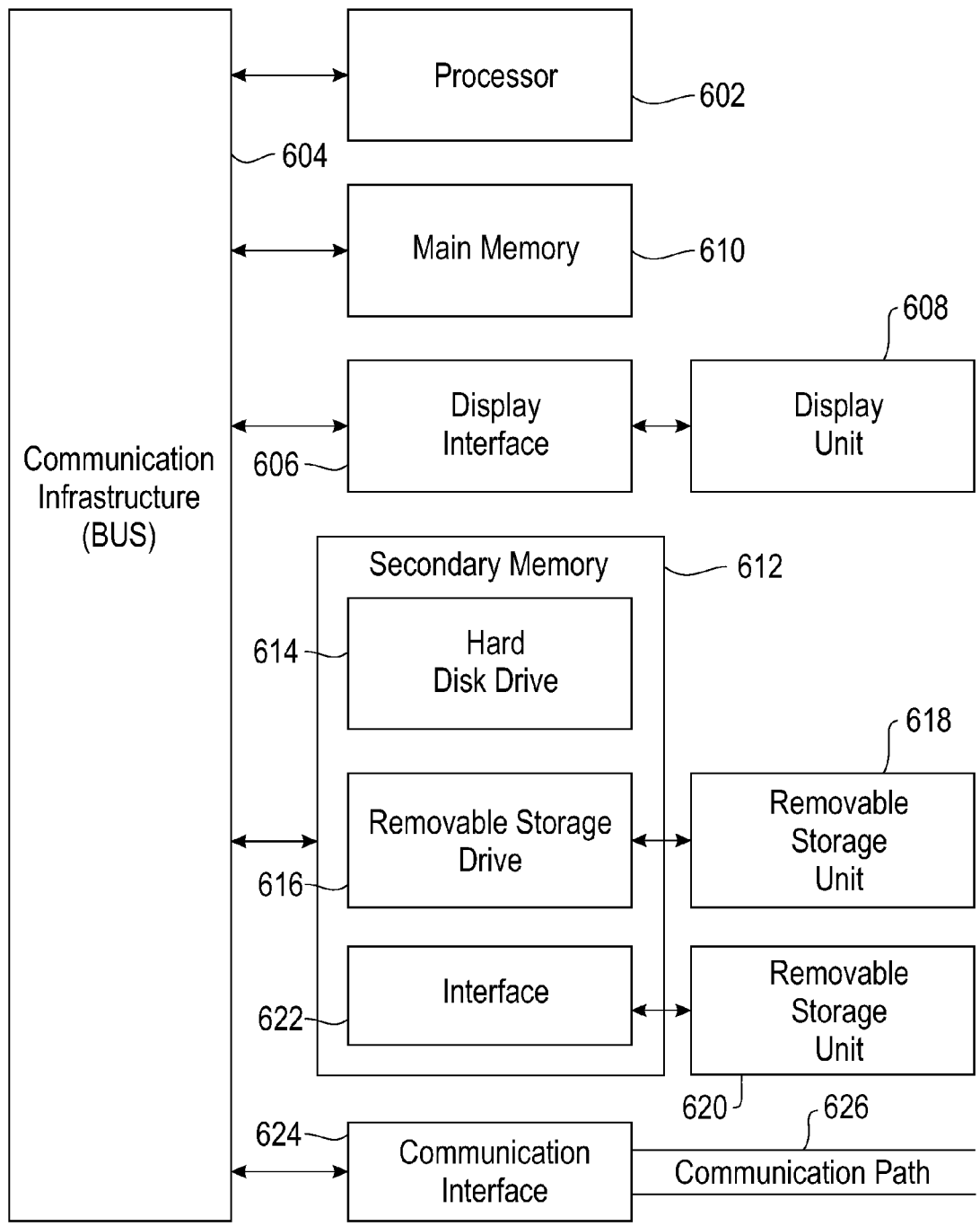
FIG. 6 is a block diagram showing a system for implementing an embodiment of the present invention

Referring now to FIG. 6 is a block diagram showing system for implementing an embodiment of the present invention. The computer system includes one or more processors, such as a processor (602). The processor (602) is connected to a communication infrastructure (604) (e.g., a communications bus, cross-over bar, or network).

The computer system can include a display interface (606) that forwards graphics, text, and other data from the communication infrastructure (604) (or from a frame buffer not shown) for display on a display unit (608). The computer system also includes a main memory (610), preferably random access memory (RAM), and may also include a secondary memory (612). The secondary memory (612) may include, for example, a hard disk drive (614) and/or a removable storage drive (616), representing, for example, a floppy disk drive, a magnetic tape drive, or an optical disk drive. The removable storage drive (616) reads from and/or writes to a removable storage unit (618) in a manner well known to those having ordinary skill in the art. Removable storage unit (618) represents, for example, a floppy disk, a compact disc, a magnetic tape, or an optical disk, etc., which is read by and written to by removable storage drive (616). As will be appreciated, the removable storage unit (618) includes a computer readable medium having stored therein computer software and/or data.

In alternative embodiments, the secondary memory (612) may include other similar means for allowing computer programs or other instructions to be loaded into the computer system. Such means may include, for example, a removable storage unit (620) and an interface (622). Examples of such means may include a program package and package interface (such as that found in video game devices), a removable memory chip (such as an EPROM, or PROM) and associated socket, and other removable storage units (620) and interfaces (622) which allow software and data to be transferred from the removable storage unit (620) to the computer system.

The computer system may also include a communications interface (624). Communications interface (624) allows software and data to be transferred between the computer system and external devices. Examples of communications interface (624) may include a modem, a network interface (such as an Ethernet card), a communications port, or a PCMCIA slot and card, etc. Software and data transferred via communications interface (624) are in the form of signals which may be, for example, electronic, electromagnetic, optical, or other signals capable of being received by communications interface (624). These signals are provided to communications interface (624) via a communications path (i.e., channel) (626). This communications path (626) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (610) and secondary memory (612), removable storage drive (616), and a hard disk installed in hard disk drive (614).

Computer programs (also called computer control logic) are stored in main memory (610) and/or secondary memory (612). Computer programs may also be received via a communication interface (624). Such computer programs, when run, enable the computer system to perform the features of the present invention as discussed herein. In particular, the computer programs, when run, enable the processor (602) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Alternative Embodiment

It will be appreciated that, although specific embodiments of the invention have been described herein for purposes of illustration, various modifications may be made without departing from the spirit and scope of the invention. In particular, the system can be configured with r copies of a file, with k write affinity copies and l wide striped copies, where k+l=r. The variable k can be between 1 and r, inclusive. An application that requires local performance can be served from one of the k write affinity copies. The variable l can be between 1 and r, inclusive. Application data can be recovered from any one or a set of r write affinity copies subsequent to failure of a processing write affinity copy. Accordingly, the scope of protection of this invention is limited only by the following claims and their equivalents.

We claim:

1. A system comprising:
a shared nothing clustered file system distributed set of server nodes, including a first server node and a second server node; wherein the file system includes: a first copy of a first application local to the first server node stored in a first write affinity region of the first server node, a second copy of the first application stored in a second write affinity region local to the second server node, a third copy of the first application stored across wide striping regions in the cluster;
a service manager to locally serve the first application from the first server node;
a copy manager to specify a number of replication copies of the first application for wide striping regions; and
following failure of the first application by the service manager, a recovery manager to move processing of the first application to the second server node being supported with the second copy in the second write affinity region and to communicate with the copy manager to recover the failed first application with the third copy.

2. The system of claim 1, wherein the second copy of the first application includes a complete set of files and data comprising the first application on a single server node.

3. The system of claim 2, wherein the recovery manager to move application processing from the first server node to the second server node supports local processing of the first application.

4. The system of claim 1, further comprising the recovery manager to rebuild application data from the third copy of the first application.

5. The system of claim 4, wherein a completed rebuild of the first application local to the first server node includes a complete set of files of the first application.

6. The system of claim 4, further comprising the service manager to process write transactions of the first application from the second server node until the recovery manager rebuild of the failed application is completed.

7. The system of claim 1, further comprising the service manager to process write transactions of the first application from the first server hosting the recovered first application after rebuild of the first node is completed.

8. The system of claim 7, wherein the recovery manager rebuild of the first application from the third copy mitigates performance impact of a second application.

9. A computer program product, the computer program product comprising a computer readable storage device having computer readable program code embodied therewith, the computer readable program code comprising:
computer readable program code configured to define at least two types of regions in a cluster file system for block allocation, including a write affinity region and a wide striping region;
computer readable program code configured to locally serve a first application from a first write affinity copy;
computer readable program code configured to move the application processing of the first application to one of the other nodes with a second write affinity copy of the first application following failure of the first application;
computer readable program code to select copies of data of the first application for storage of a third copy of the first application in wide stripe regions across the cluster; and
computer readable program code to recover the first application with the first application in the wide stripe regions.

10. The article of claim 9, wherein the first write affinity copy of the first application includes a complete set of files and data comprising the first application local to a first server node, and the second write affinity copy of the first application includes a complete set of files and data comprising the first application local to a second server node.

11. The article of claim 10, wherein the code to move application processing from the first server node to the second server node supports local processing of the first application.

12. The article of claim 9, wherein the code to recover the first application on the first server node further comprising computer readable program code to rebuild application data from the third copy of the first application.

13. The article of claim 12, further comprising computer readable program code to process write transactions of the application from a server hosting the recovered first application after the rebuild is completed.

14. The article of claim 13, wherein a completed rebuild of the first application local to the first node includes a complete set of files of the first application.

15. The article of claim 9, further comprising computer readable program code to process write transactions of the first application from the second write affinity copy until the rebuild is completed.

16. The article of claim 15, wherein the computer readable program code to rebuild the first application from the third copy mitigates performance impact of a second application.

* * * * *